(12) United States Patent
Li et al.

(10) Patent No.: US 11,438,933 B2
(45) Date of Patent: Sep. 6, 2022

(54) ASSIGNMENT OF RANDOM ACCESS CHANNEL RESOURCES TO INFORMATION REQUESTS

(71) Applicant: ZTE Corporation, Guangdong (CN)

(72) Inventors: Wenting Li, Guangdong (CN); He Huang, Guangdong (CN); Fei Dong, Guangdong (CN)

(73) Assignee: ZTE Corporation, Guangdong (CN)

( * ) Notice: Subject to any disclaimer, the term of this patent is extended or adjusted under 35 U.S.C. 154(b) by 139 days.

(21) Appl. No.: 17/029,383

(22) Filed: Sep. 23, 2020

(65) Prior Publication Data

US 2021/0076427 A1    Mar. 11, 2021

Related U.S. Application Data

(63) Continuation of application No. PCT/CN2018/081873, filed on Apr. 4, 2018.

(51) Int. Cl.
*H04W 4/00* (2018.01)
*H04W 74/08* (2009.01)
*H04W 72/04* (2009.01)

(52) U.S. Cl.
CPC ... *H04W 74/0833* (2013.01); *H04W 72/0446* (2013.01)

(58) Field of Classification Search
CPC .............. H04W 74/0833; H04W 72/0446
See application file for complete search history.

(56) References Cited

U.S. PATENT DOCUMENTS

| | | | |
|---|---|---|---|
| 2016/0029358 A1 | 1/2016 | Hou et al. | |
| 2017/0111886 A1 | 4/2017 | Kim et al. | |
| 2020/0037297 A1* | 1/2020 | Pan | H04W 72/005 |
| 2020/0288417 A1* | 9/2020 | Harada | H04W 56/001 |

FOREIGN PATENT DOCUMENTS

| | | |
|---|---|---|
| CN | 101841922 A | 9/2010 |
| CN | 101911783 A | 12/2010 |
| CN | 106304383 A | 1/2017 |
| CN | 106358301 A | 1/2017 |
| CN | 107278383 A | 10/2017 |
| CN | 107371273 A | 11/2017 |
| CN | 107690172 A | 2/2018 |
| EP | 2 986 075 A4 | 4/2016 |
| WO | 2017/022902 A1 | 2/2017 |

(Continued)

OTHER PUBLICATIONS

3GPP TSG-RAN2 Meeting #101, "RACH Configuration for Msg1 based On-Demand SI Request", R2-1803368 (Year: 2018).*

(Continued)

*Primary Examiner* — Siren Wei
(74) *Attorney, Agent, or Firm* — Perkins Coie LLP

(57) ABSTRACT

Some techniques for efficiently indicating a mapping relationship from physical random access channel preambles and/or random access resource specific to one or more system information blocks in a wireless communication network are described. One example method includes transmitting, from a network node, a message that identifies a number of random access preambles that are reserved for transmissions of system information requests by mobile devices.

16 Claims, 18 Drawing Sheets

(56) References Cited

FOREIGN PATENT DOCUMENTS

WO    2017/155239 A2    9/2017
WO    2017/162180 A1    9/2017

OTHER PUBLICATIONS

3GPP TSG RAN WG1 Meeting 90bis, "Discussion on remaining details on PRACH formats", R1-1718183 (Year: 2017).*
Chinese Office Action dated Apr. 26, 2021 for Chinese Patent Application No. 201880092190.0, filed on Apr. 4, 2018 (18 pages).
Huawei, Hisilicon, "RACH Proceduresand Resource Configuration," 3GPP TSG RAN WG1 Meeting #88, Athens, Greece, R1-1701724, 7 pages, Feb. 13-17, 2017.
Korean Office Action dated Aug. 20, 2021 for Korean Patent Application No. 10-2020-7031619, filed on Apr. 4, 2018 (7 pages).
International Search Report and Written Opinion, PCT/CN2018/081873 dated Jan. 4, 2019, 10 pages.
Chinese Office Action dated Dec. 15, 2021 for Chinese Patent Application No. 201880092190.0, filed on Apr. 4, 2018, 9 pages (with unofficial translation).
CATT, "Summary of email discussion [94#40] [eNB-IoTenh] RACH on non-anchor carrier," 3GPP TSG-RAN WG2 Meeting# 95bis R2-166210, Kaohsiung, Oct. 10-14, 2016, 21 pages.
Jialin, et al. "Guangxi Communication Technology," Dec. 15, 2016, Issue 04, 4 pages.
Lanlan, et al. "Telecom Engineering Technics and Standardization", Oct. 15, 2012, 6 pages.
European Extended Search Report, EP Appl. No. 18913503.1, dated Feb. 25, 2021, 6 pages.
NTT DOCOMO, INC. "Discussion on remaining details on PRACH formats" 3GPP TSG RAN WG1 Meeting 90bis, Prague, CZ, Oct. 9-13, 2017, 11 pages.
Huawei, HiSilicon, "RACH Configuration for Msg1 based On-Demand SI Request," 3GPP TSG-RAN2 Meeting #101, Athens, Greece, Feb 26-Mar. 2, 2018, 5 pages.

* cited by examiner

US 11,438,933 B2

ASSIGNMENT OF RANDOM ACCESS CHANNEL RESOURCES TO INFORMATION REQUESTS

This patent document is a continuation of and claims benefit of priority to International Application No. PCT/CN2018/081873, filed on Apr. 4, 2018. The entire content of the before-mentioned patent application is incorporated by reference as part of the disclosure of this application.

TECHNICAL FIELD

This document relates to systems, devices and techniques for wireless communications.

BACKGROUND

Efforts are currently underway to define next generation wireless communication networks that provide greater deployment flexibility, support for a multitude of devices and services and different technologies for efficient bandwidth utilization. The next generation wireless communication networks are also expected to deploy new core networks that provide additional services and flexibility beyond currently available core networks.

SUMMARY

This document describes technologies, among other things, for efficiently signaling mapping between system information requests and random access transmission occasions.

In one example aspect, a method of wireless communication is disclosed. The method includes transmitting, from a network node, a message that identifies a number of random access preambles that are reserved for transmission of system information requests by mobile devices.

In another example aspect, a method of wireless communication is disclosed. The method includes mapping, by a network node, system information request to a preamble or a random access transmission occasion based on a number of random access transmission occasions for each beam of transmission indicated in a message.

In yet another example aspect, a method of wireless communication is disclosed. The method includes receiving, by a mobile device, a message that identifies a number of random access preambles that are reserved for transmissions of system information requests by the mobile device.

In yet another example aspect, a method of wireless communication is disclosed. The method includes mapping, by a mobile device, a system information request to a preamble or a random access transmission occasion based on a number of random access transmission occasions for each beam of transmission indicated in a message.

In yet another example aspect, a wireless communications apparatus comprising a processor is disclosed. The processor is configured to implement methods described herein.

In another example aspect, the various techniques described herein may be embodied as processor-executable code and stored on a computer-readable program medium.

The details of one or more implementations are set forth in the accompanying drawings, and the description below. Other features will be apparent from the description and drawings, and from the claims.

BRIEF DESCRIPTION OF THE DRAWINGS

Like reference symbols in the various drawings indicate like elements.

DETAILED DESCRIPTION

Figure 1:
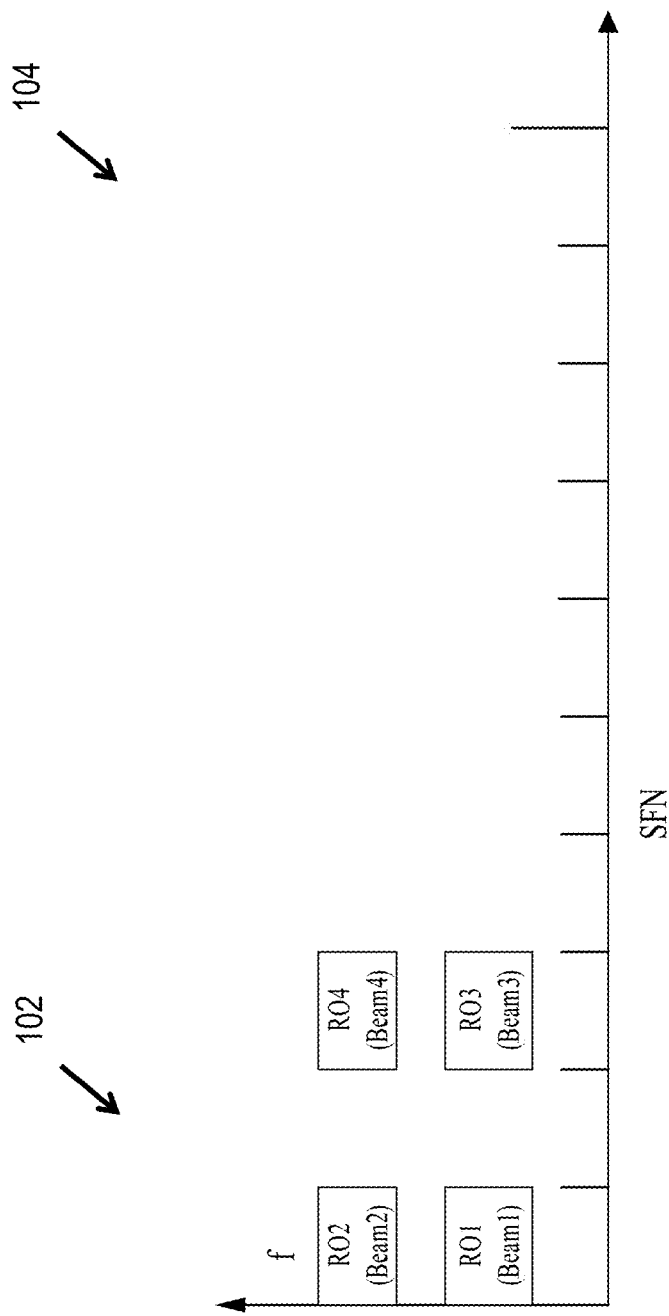
FIG. 1 shows an example of mapping of random access channel occasions (RO) to beams.

In wireless communication networks, during the time a user equipment (UE) or a mobile device, such as a smartphone, tablet, laptop, a machine to machine (M2M) communication device or an Internet of Things (IoT) device is joining a communication network, a random access procedure is used for the user device to acquire parameters of the wireless network (e.g., system information, or SI) that are helpful in establishing further communication between the network and the user device. The amount of information exchanged during the random access procedure could be a large overhead and take bandwidth away from the data communication in the network. This problem has become especially more important in the upcoming 5G networks and the New Radio framework because of the use of multiple transmission beams and the use of beamsweeping in which the network progressively transmits different beams and the user device calculates the best beam for communication between itself and the network node (e.g., a base station). Too many bits are needed to explicitly indicate the mapping relationship between random access channel (RACH, also called Rach in the present document) Resources and system information (SI) request.

In LTE, all of the SIs are broadcast periodically, but in NR, the On-demand mechanism was introduced, by which, the UE send SI request to acquire system information that are not always broadcasting. There are two SI request schemes based on which Msg was used. A message is message that is pre-defined by the system for initial communication between the network and a user device during the random access procedure.

The two request schemes are: Msg1 based and Msg3 based. Furthermore, the following agreements have been made in the previous meetings:

(a) If the PRACH preamble and/or PRACH resource specific to each SIB or set of SIB s which the UE needs to acquire is included in minimum SI then SI request is indicated using MSG (b) For MSG1 based SI request, the minimum granularity of requested SI is one SI message (a set of SIBs as in LTE).

(c) For MSG1 based SI request, one RACH preamble can be used to request for multiple SI messages.

Then in increasing number of frequency multiplexed RACH occasion.

Then in increasing number of time-domain RACH occasion within a RACH slot.

Then in increasing number of RACH slots.

The number of synchronization sequence and physical broadcast channel SS/PBCH blocks (SSBs) associated to one RACH occasion is determined by parameter SSB-per-rach-occasion. If SSB-per-rach-occasion is less than one, one SS/PBCH is mapped to 1/SSB-per-rach-occasion consecutive RACH occasions.

The related AS1 coding is listed as follow:

TABLE 1

RACH-ConfigCommon information element

```
-- ASN1START
-- TAG-RACH-CONFIG-COMMON-START
RACH-ConfigCommon ::=                SEQUENCE {
    -- Generic RACH parameters
    rach-ConfigGeneric               RACH-ConfigGeneric,
    -- Total number of preambles used for contention based and contention free
random access, excluding
    -- preambles used for other purposes (e.g. for SI request). If the field is absent,
the UE may use all 64 preambles for RA.
    totalNumberOfRA-Preambles        INTEGER (1..63)
                                     OPTIONAL,  --Need S
    -- Number of SSBs per RACH occasion (L1 parameter
'SSB-per-rach-occasion') and the number of Contention Based preambles per SSB
    -- (L1 parameter 'CB-preambles-per-SSB'). By multiplying the two values,
the UE determines the total number of CB preambles.
    ssb-perRACH-OccasionAndCB-PreamblesPerSSB   CHOICE {
        oneEighth                    ENUMERATED
{n4,n8,n12,n16,n20,n24,n28,n32,n36,n40,n44,n48,n52,n56,n60,n64},
        oneFourth                    ENUMERATED
{n4,n8,n12,n16,n20,n24,n28,n32,n36,n40,n44,n48,n52,n56,n60,n64},
        oneHalf                      ENUMERATED
{n4,n8,n12,n16,n20,n24,n28,n32,n36,n40,n44,n48,n52,n56,n60,n64},
        one                          ENUMERATED
{n4,n8,n12,n16,n20,n24,n28,n32,n36,n40,n44,n48,n52,n56,n60,n64},
        two                          ENUMERATED
{n4,n8,n12,n16,n20,n24,n28,n32},
        four                         INTEGER (1..16),
        eight                        INTEGER (1..8),
        sixteen                      INTEGER (1..4)
    }
                                     OPTIONAL,  --Need M
```

But how to map the PRACH preamble and/or PRACH resource specific to each SIB or set of SIBs is still an open issue. Meanwhile, the beamsweeping effect on this mapping will also considered, which means besides the requested SIs, the NodeB will also distinguish the best DL beams from the PRACH preamble and/or PRACH resource.

For the normal Rach procedure, the NodeB distinguish the best DL beams based on the following agreements and ASN1 coding as listed in Table 1:

gNB configures in RMSI the following: (1) Number of CBRA preambles per SSB per RACH transmission occasion, (2) Number of SSBs per RACH occasion, (3) Number of CBRA preambles per SSB per RACH transmission occasion, (4) Maximum size for the range of values: 4 bits, (5) Number of SSBs per RACH occasion, (6) Maximum size for the range of values: 3 bits.

In some embodiments, the actually transmitted SS/PBCH blocks are associated to RACH transmission according in the following order:

First in increasing preamble indices within a single RACH occasion.

Based on this rule, the network indicate the Number of SSBs per RACH occasion and the number of Contention Based preambles per SSB.

TABLE 2

| oneEighth | ENUMERATED {n4,n8,n12,n16,n20,n24,n28,n32,n36,n40,n44,n48,n52,n56,n60,n64}, |
|---|---| means for each SSB (or each beam direction), there were 8 ROs (or for each RO, there is ⅛ SSB), then for each RO, there are 40 preambles can be used.

TABLE 3

| sixteen | INTEGER (1..4) |
|---|---| means for each RO, there would be 16 different beams, then the different preamble Indexes are needed to indicate different beams. For that there are 64 preamble Indexes at most, so for each beam, there were 64/16 preambles at most.

When it comes to the SI request-triggered Rach procedure, the difference is that besides the best beam information, the dedicated SI combination is also be indicated. If a fully explicit method as follow is used, too many bits are needed, which may lead to a big size of SIB 1.

TABLE 4

```
-- 1 list entry per SI message in schedulingInfoList.
SI-Request-Config   ::=            SEQUENCE (SIZE (1..maxSI-Message)) OF
SI-RequestMsg1-Config
-- Resources for Msg1 based on-demand SI request.
SI-Request-Msg1Config ::=  SEQUENCE {
-- If absent then Msg1 based request is not configured for this SI message.
    si-Request-Resources SI-Request-Resources OPTIONAL - Cond Msg1
}
-- Resources for Msg1 based request
SI-Request-Resources ::=    SEQUENCE {
    ssb-ResourceList                        SEQUENCE
(SIZE(1..maxRA-SSB-Resources)) OF SI-Request-SSB-Resource,
        -- Explicitly signalled PRACH Mask Index for RA Resource selection in
TS 36.321.
        -- The mask is valid for all SSB resources signalled in ssb-ResourceList
    ra-ssb-OccasionMaskIndex          INTEGER (0..15)
}
SI-Request-SSB-Resource ::=               SEQUENCE {
    -- The ID of an SSB transmitted by this serving cell.
    ssb                                  SSB-Index,
    -- The preamble index that the UE will use when performing SI request
    ra-PreambleIndex                     INTEGER (0..63),
    ...
}
```

In this document, we disclose a more efficient way to indicate mapping relationship from the PRACH preamble and/or PRACH resource specific to each SIB or set of SIBs, in which the beamsweeping effect on this mapping was also considered. Section headings are used in the present document only for ease of understanding, and do not limit the scope of the subject matter and embodiments described in any section only to that section.

Example Methods

Figure 15:
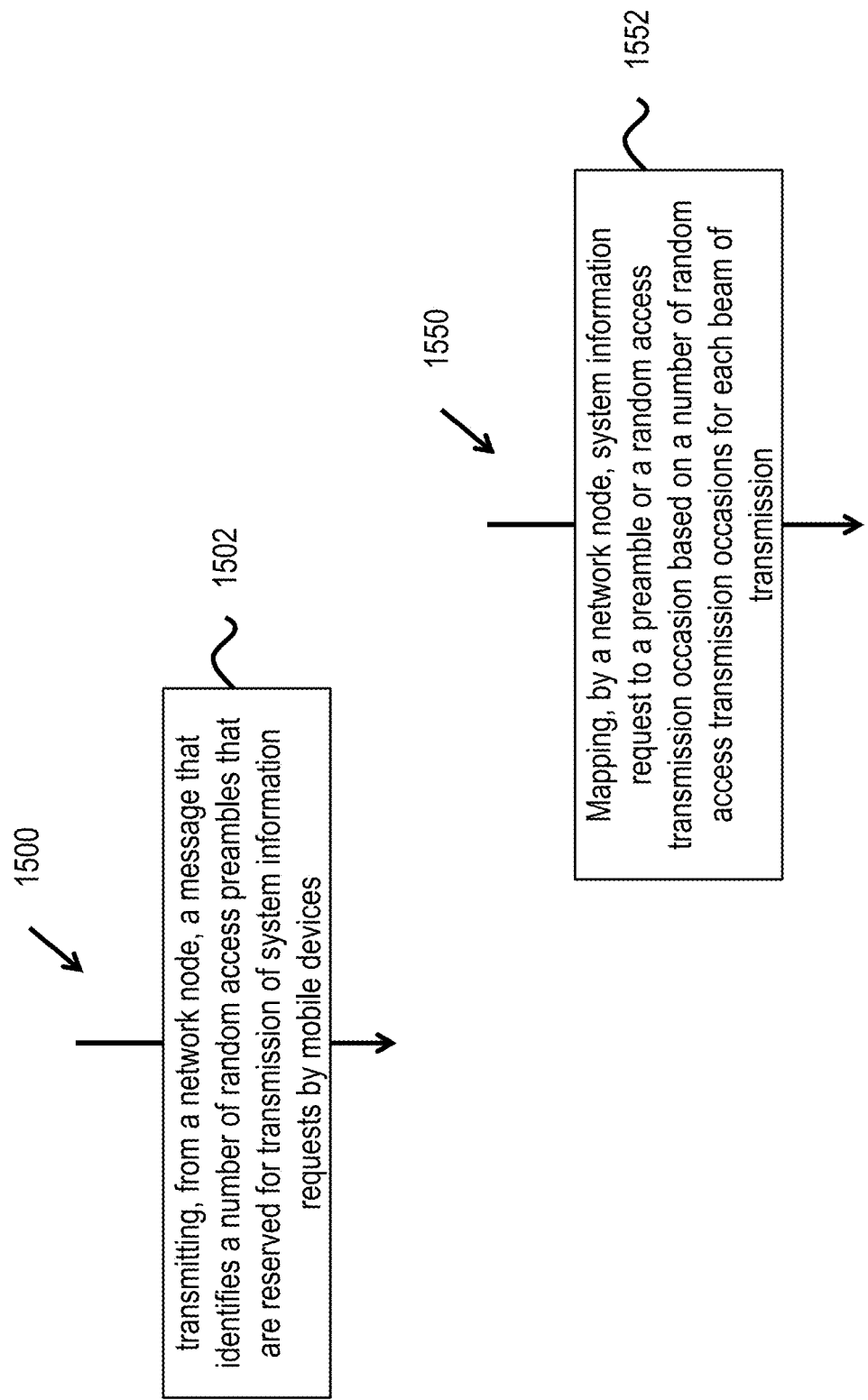
FIG. 15 is a flowchart of an example wireless communication method.

FIG. 15 depicts a flowchart for an example method 1500 of wireless communication. The method 1500 includes transmitting (1502), from a network node, a message that identifies a number of random access preambles that are reserved for transmission of system information requests by mobile devices.

FIG. 15 depicts a flowchart for an example method 1550 of wireless communication. The method 1550 includes mapping (1552), by a network node, system information request to a preamble or a random access transmission occasion based on a number of random access transmission occasions for each beam of transmission.

Figure 16:
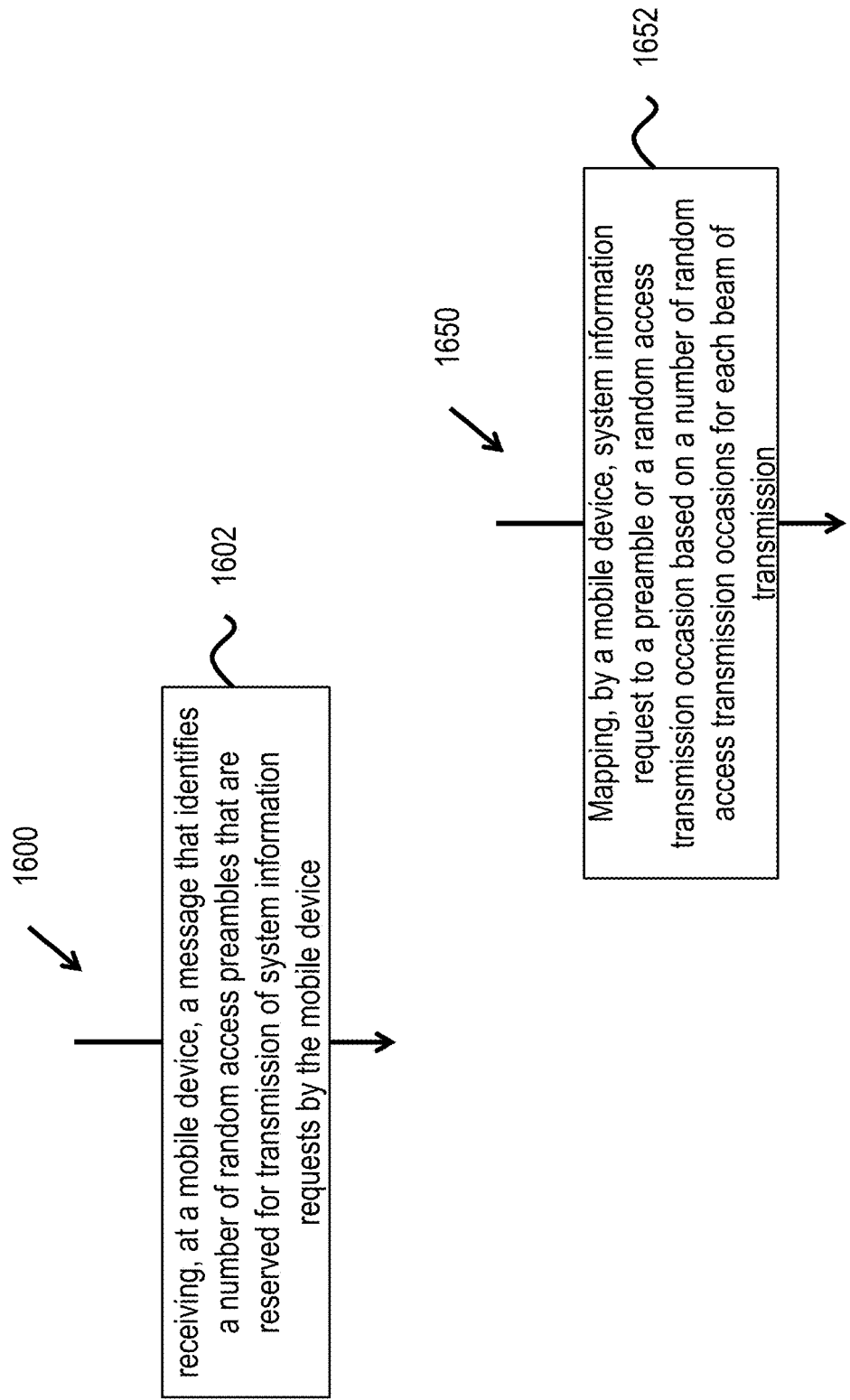
FIG. 16 is a flowchart of an example wireless communication method.

FIG. 16 depicts a flowchart for an example method 1600 of wireless communication. The method includes receiving (1602), by a mobile device, a message that identifies a number of random access preambles that are reserved for transmissions of system information requests by the mobile device.

FIG. 16 depicts a flowchart for an example method 1650 of wireless communication is disclosed. The method 1650 includes mapping (1552), by a mobile device, system information request to a preamble or a random access transmission occasion based on a number of random access transmission occasions for each beam of transmission.

For example, in the methods 1500, 1600, 1550, 1650, the network node is the base station or gNodeB of a cellular communication system. The random access preambles may for example be RACH preambles in a 5G system. For example the random access transmission occasions may be RACH Occasions (ROs) as are described with respect to FIGS. 1 to 12.

In the above described methods 1500, 1550, 1600 and 1650, the message may be a radio resource control (RRC) message and the message further includes one or more additional parameters defining a procedure for the system information requests by mobile devices. In some embodiments, the one or more additional parameters include: (a) a Msg1-based system information (SI) index list or a Msg1-based system information request bitmap, and (b) a random access channel configuration index identifying random access channel configuration parameters. In some embodiments, the following additional parameters may be included: a number of preambles that reserved for the system information requests, a start preamble index, or a number of random access channel transmission occasions that are frequency division multiplexed in one time slot.

In some embodiments, e.g., with respect to methods 1500 and 1600, the network node may transmit a bitmap identifying system information to be requested. In some embodiments, an index x for each Msg1-based system information combination is $x=\Sigma_{i=1}^{n} i*2^{i-1}$, where i is ith bit in the system information request bitmap, n is an integer representing a number of system information to be requested.

In some embodiments, the methods 1500, 1550, 1600, 1650 may further include: determining, a number of system information request preambles; determining, based on the starting index, preamble indexes used for system information requests, determining a mapping from preamble indexes or random access occasions to each system information combination; and determining a number of random access occasions for each beam of transmission.

With respect to methods 1550 and 1650, in some embodiments, a number of system information random access transmission occasions for each beam is based on a parameter. For example, the parameter is used for determining a number of preambles for system information requests, and for determining a mapping between each system information combination and a corresponding preamble index or random access transmission occasion. In some embodiments, the number of SSB for each RO is m, the number of preambles is determined by n and m, where n is an integer representing a number of requested SIs.

Further embodiments and implementation examples are described below. To help with better understanding of examples, ASN1 like pseudo-code is provided in tables accompanying the various examples. The tables explain the usage of various example parameters and fields and the values that these parameters can take, e.g., in the NR standard. Furthermore, FIGS. 1, 3, 6 and 9 have been depicted with subframe numbers along the horizontal axis and corresponding random access transmission opportunities (RO) for different beams along the vertical axis representing frequency f. In FIGS. 2, 4, 5, 7, 8, and 10 to 13, the horizontal axis represents transmission time slots, and the vertical axis represents frequency f, with a mapping of RO and beams in the two-dimensional resource plane represented by slots and frequency.

Implementation Example 1

NodeB indicates the number of preambles that reserved for the SI request. In some cases, these preambles are used for the SI request only.

Example 1-1

In this example, the network node, e.g., NodeB, indicates the number of preambles that reserved for the SI request, these preambles are used for the SI request only. Table 5 shows an example use.

TABLE 5

```
RACH-ConfigCommon ::=              SEQUENCE {
    -- Generic RACH parameters
    rach-ConfigGeneric             RACH-ConfigGeneric,
    -- Total number of preambles used for contention based and contention free random
access, excluding
    -- preambles used for other purposes (e.g. for SI request). If the field is absent, the
UE may use all 64 preambles for RA.
    totalNumberOfRA-Preambles      INTEGER (1..63)
-- Total number of preambles used for SI request which will be less then
64-totalNumberOfRA-Preambles. If the field is absent, -- determine the SI request and
Preamble mapping based on the ssb-perRACH-OccasionAndCB-PreamblesPerSSB.
    numberOfRA-PreamblesForSIReq   INTEGER (1..64)    OPTIONAL,
    ...
}
```

Example 1-2

NodeB indicates the Start preamble Index used for SI request, if this absent, the start preamble Index depends on CB-preambles-per-SSB, where the CB-preambles-per-SSB is the number of normal RA per SSB. Table 6 shows an example use of these parameters.

TABLE 6

```
RACH-ConfigCommon ::=              SEQUENCE {
    -- Generic RACH parameters
    rach-ConfigGeneric             RACH-ConfigGeneric,
    -- Total number of preambles used for contention based and contention free
random access, excluding
    -- preambles used for other purposes (e.g. for SI request). If the field is absent, the
UE may use all 64 preambles for RA.
    totalNumberOfRA-Preambles      INTEGER (1..63)
-- Total number of preambles used for SI request which will be less then
64-totalNumberOfRA-Preambles. If the field is absent, -- determine the SI request and
Preamble mapping based on the ssb-perRACH-OccasionAndCB-PreamblesPerSSB.
    numberOfRA-PreamblesForSIReq   INTEGER (1..64)    OPTIONAL,
----Start preamble Index used for SI request, if this absent, it starts with preamble index
="CB-preambles-per-SSB+1".  preambleForSIReqIndex- Start     INTEGER
(1..64) OPTIONAL,
    ...
}
```

Example 1-3

NodeB indicates the Msg1 based SI request Bitmap. Table 7 shows
example parameter values for the SIB1 message.

TABLE 7

```
SIB1 ::=  SEQUENCE {
    ...
    si-SchedulingInfo              SI-SchedulingInfo
    OPTIONAL,
    ...
}
```

TABLE 7-continued

```
SI-SchedulingInfo ::=         SEQUENCE {
...
msg1-basedSIReqBitmap   BIT STRING (SIZE (maxSI-Message)) OPTIONAL,
...
}
```

Implementation Example 2

Example 2-1

At UE side, UE determine the Msg1-based SI Index list. Table 8 shows an example of the bitmap and its interpretation.

TABLE 8

Msg1-basedSIReqBitmap = 10101100 00000000 00000000 00000000
Then the Msg1-based SI Index list is si1/si3/si5/si6: SI[1] = si1  SI[2] = si3
SI[3] = si5  SI[4] = si6

Example 2-2

Figure 14:
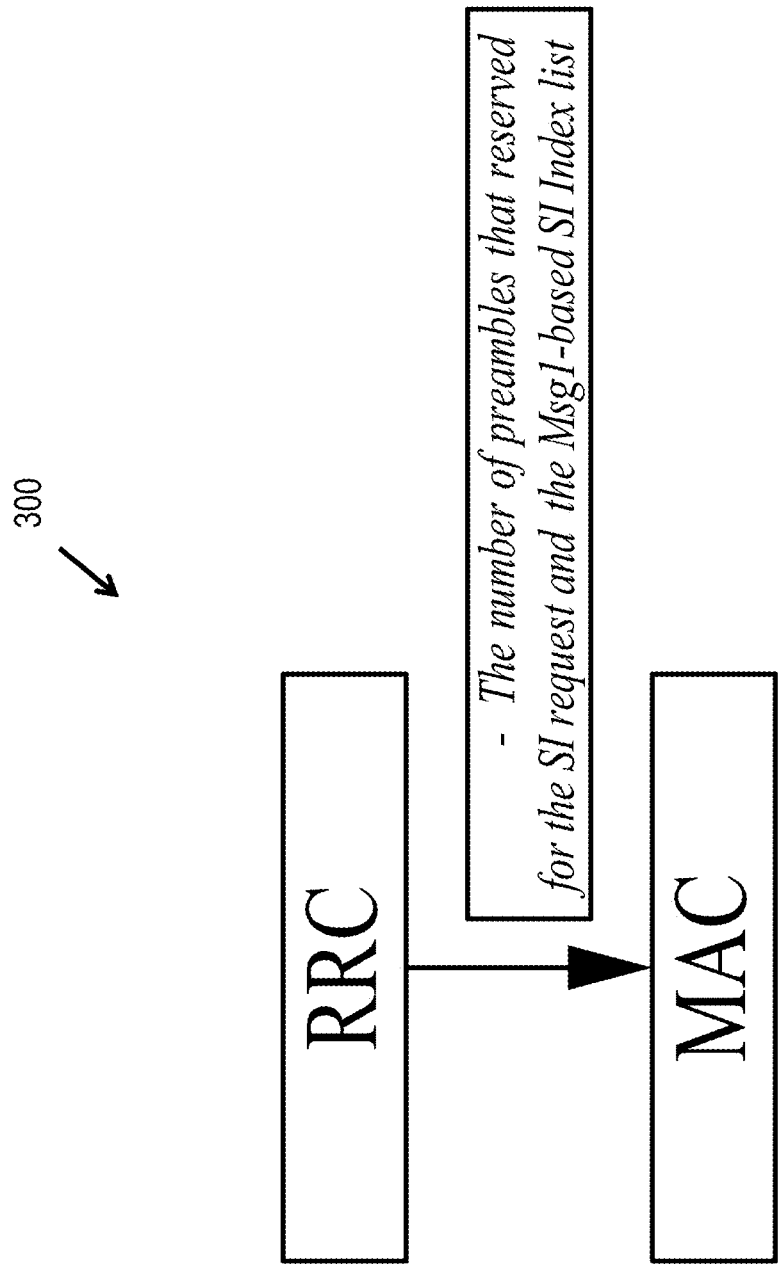
FIG. 14 shows an example of messages exchanged between the radio resource and media access layers.

RRC configure the following SI request related parameters for the Msg1-based SI request procedure:
  The number of preambles that reserved for the SI request if it is present. (this parameter is optional).
  The start preamble Index if it is present (this parameter is optional).
  The Msg1-based SI Index list or Msg1-basedSIReqBitmap.
  The number of PRACH transmission occasions FDMed in one time slot (this parameter is optional)
  Prach configuration Index. FIG. 14 shows a message exchange from the radio resource control layer (RRC) to the medium access control (MAC) layer of an example implementation on the base station side or the mobile device side.

Example 2-3

At UE side, determine the preamble Indexes based on the following parameters, as shown in Table 9.

TABLE 9

```
totalNumberOfRA-Preambles         INTEGER (1..63)
-- Total number of preambles used for SI request which will be less then
64-totalNumberOfRA-Preambles. If the field is absent, -- determine the SI request and
Preamble mapping based on the ssb-perRACH-OccasionAndCB-PreamblesPerSSB.
    numberOfRA-PreamblesForSIReq    INTEGER (1..64)  OPTIONAL,
----Start preamble Index used for SI request, if this absent, it starts with preamble index
="CB-preambles-per-SSB+1" .  preambleForSIReqIndex- Start  INTEGER (1..64)
OPTIONAL,
    ssb-perRACH-OccasionAndCB-PreamblesPerSSB  CHOICE {
        oneEighth                ENUMERATED
{n4,n8,n12,n16,n20,n24,n28,n32,n36,n40,n44,n48,n52,n56,n60,n64},
        oneFourth                ENUMERATED
{n4,n8,n12,n16,n20,n24,n28,n32,n36,n40,n44,n48,n52,n56,n60,n64},
        oneHalf                  ENUMERATED
{n4,n8,n12,n16,n20,n24,n28,n32,n36,n40,n44,n48,n52,n56,n60,n64},
        one                      ENUMERATED
{n4,n8,n12,n16,n20,n24,n28,n32,n36,n40,n44,n48,n52,n56,n60,n64},
        two                      ENUMERATED
{n4,n8,n12,n16,n20,n24,n28,n32},
        four                     INTEGER (1..16)
        eight                    INTEGER (1..8)
        sixteen                  INTEGER (1..4)
    }
```

The following pseudo-code explains the usage:
1>If numberOfRA-PreamblesForSIReqis present
  2>if preambleForSIReqIndex-Start is present, the preamble Indexes that used for the SI, Request is:
    [preambleForSIReqIndex-Start, preambleForSIReqIndex-Start+numberOfRA-PreamblesForSIReq-1]
  2>else, the preamble Indexes that used for the SI Request is:
    [CB-PreamblesPerSSB, CB-PreamblesPerSSB+numberOfRA-PreamblesForSIReq-1]
1>else
  2>if preambleForSIReqIndex-Start present, the preamble Indexes that used for the SI Request is:
    [preambleForSIReqIndex-Start, preambleForSIReqIndex-Start+ActualNeededPreambles-1]
  2>else, the preamble Indexes that used for the SI Request is:
    [CB-PreamblesPerSSB+1, CB-PreamblesPerSSB+ActualNeededPreambles]

In which CB-PreamblesPerSSB is the last preamble Index used for the Normal RA on each SSB, while the ActualNeededPreambles=$(2^n-1)$*ssbperRACHOccasion the number of the actual used preambles for the SI request, in which n is the number of Msg1-based SIs.

The configuration of numberOfRA-PreamblesForSIReq/n/ssb-perRACH-Occasion/CB-PreamblesPerSSB will make sure that the number of Preamble in one RO is less than or equal to 64. The usage and parameter values are shown in Table 10.

TABLE 10

| |
|---|
| numberOfRA-PreamblesForSIReq  10 |
|    preambleForSIReqIndex- Start  40 |
|      ssb-perRACH-OccasionAndCB-PreamblesPerSSB   CHOICE { |
|        oneEighth                ENUMERATED |
| {n4,n8,n12,n16,n20,n24,n28,n32,n36,n40,n44,n48,n52,n56,n60,n64 |

Then the preamble Indexes that used for the SI request are [40,49]. Table 11 shows another example.

TABLE 11

| |
|---|
| numberOfRA-PreamblesForSIReq  10 |
|    preambleForSIReqIndex- Start  not present |
|      ssb-perRACH-OccasionAndCB-PreamblesPerSSB   CHOICE { |
|        oneEighth                ENUMERATED |
| {n4,n8,n12,n16,n20,n24,n28,n32,n36,n40,n44,n48,n52,n56,n60,n64}, |
| } |

Then the preamble Indexes that used for the SI request are [40,40+x−1], where x=($2^n$−1)*ssbperRACHOccasion and n is the number of MSG1-Based SIs.

TABLE 12

| |
|---|
| numberOfRA-PreamblesForSIReq  not present |
|    preambleForSIReqIndex- Start  not present |
|      ssb-perRACH-OccasionAndCB-PreamblesPerSSB   CHOICE { |
|        oneEighth                ENUMERATED |
| {n4,n8,n12,n16,n20,n24,n28,n32,n36,n40,n44,n48,n52,n56,n60,n64}, |
| } |

For the parameter values indicated in Table 12, the preamble Indexes that used for the SI request are [37, 36+x], where x=($2^n$−1)*ssbperRACHOccasion and n is the number of MSG1-Based SIs.

Implementation Example 3

Then network indicate the NumberOfRA-PreamblesFor-SIReq as shown in the Example 1-1. The MAC entity determine the corresponding preamble Index and RACH resource based on the NumberOfRA-PreamblesForSIReq.

Example 3-1

The number of preambles that reserved for the SI request is equal to the number of the Msg1-based SIs Combinations: ($2^n$−1), where n is the number of the Msg1-Based SIs.

Assume the number of beams=4, and assume the RRC configure the following parameters for the Msg1-based SI request procedure:

The number of preambles that reserved for the SI request: 15

The Msg1-based SI Index list: SI1/SI2/SI3/SI4

The number of PRACH transmission occasions FDMed in one time slot: 2

Prach configuration Index 12 (the preamble was transmitted only at even SFN with subframe=0, 2, 4, 6, 8. These parameter values are shown in Table 13. In the description below, steps that may be performed by a wireless device to obtain the mapping are disclosed. The wireless device may be a network-side device (e.g., a network node) or a user device.

TABLE 13

| PRACH Configuration Index | Preamble format | $n_{SFN}$ mod x = y | | Subframe number | Starting symbol | Number of PRACH slots within a subframe | Number of PRACH occasions within a RACH slot |
|---|---|---|---|---|---|---|---|
| 12 | 0 | 1 | 0 | 0, 2, 4, 6, 8 | — | — | — |

Step 1: Identify each SI combination based on the requested SI bitmap as follow (Table 14):

TABLE 14

| Indexes for each SI combination | |
|---|---|
| SI combination Index | SI bitmap |
| Index 1 | SI4--0001 |
| Index 2 | SI3 --0010 |
| Index 3 | SI3/SI4--0011 |
| Index 4 | SI2-0100 |
| Index 5 | SI2/SI4--0101 |
| Index 6 | SI2/SI3--0110 |
| Index 7 | SI2/SI3/SI4--0111 |
| Index 8 | SI1--1000 |
| Index 9 | SI1/SI4--1001 |
| Index 10 | SI1/SI3--1010 |
| Index 11 | SI1/SI3/SI4--1011 |
| Index 12 | SI1/SI2--1100 |
| Index 13 | SI1/SI2/SI4--1101 |
| Index 14 | SI1/SI2/SI3--1110 |
| Index 15 | SI1/SI2/SI3/SI4--1111 |

$$\left\lceil \frac{2^4 - 1}{15} \right\rceil = 1$$

Step 2: Then for each beam, RO is to be used, the mapping from RO to each beam is shown in FIG. 1.

Step 3: The mapping from SI request to RO on each beam are shown in FIG. 2.

Figure 2:
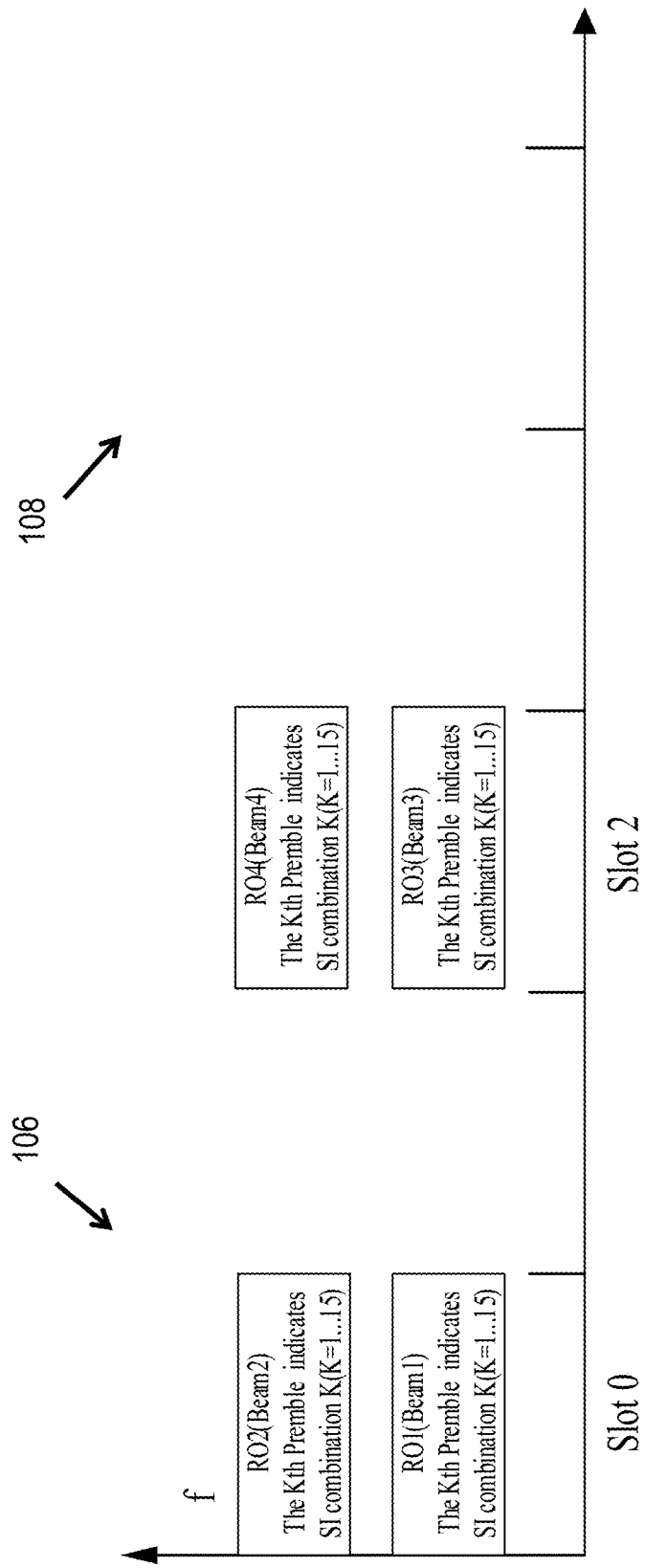
FIG. 2 shows an example mapping between system information (SI) requests and RO.

In the FIG. 2, the k th preamble is the kth preamble in the SI Preamble pool as explained in Example 2-3.

Both the UE and NodeB will comply the same mapping rule as above.

Example 3-2

The number of preambles that reserved for the SI request is smaller than the number of the Msg1-based SIs Combinations: ($2^n$−1), where n is the number of the Msg1-Based SIs.

Assume the number of beams=4, and assume the RRC configure the following parameters for the Msg1-based SI request procedure:

The number of preambles that reserved for the SI request: 4

The Msg1-based SI Index list: SI1/SI2/SI3/SI4

The number of PRACH transmission occasions FDMed in one time slot: 2

Prach configuration Index 12 (the preamble was transmitted only at even SFN with subframe=0, 2, 4, 6, 8.

Step 1: Identify each SI combination based on the requested SI bitmap as in Table 1:

Step 2: Then for each beam, $$\left\lceil \frac{2^4 - 1}{4} \right\rceil = 4$$

Figure 3:
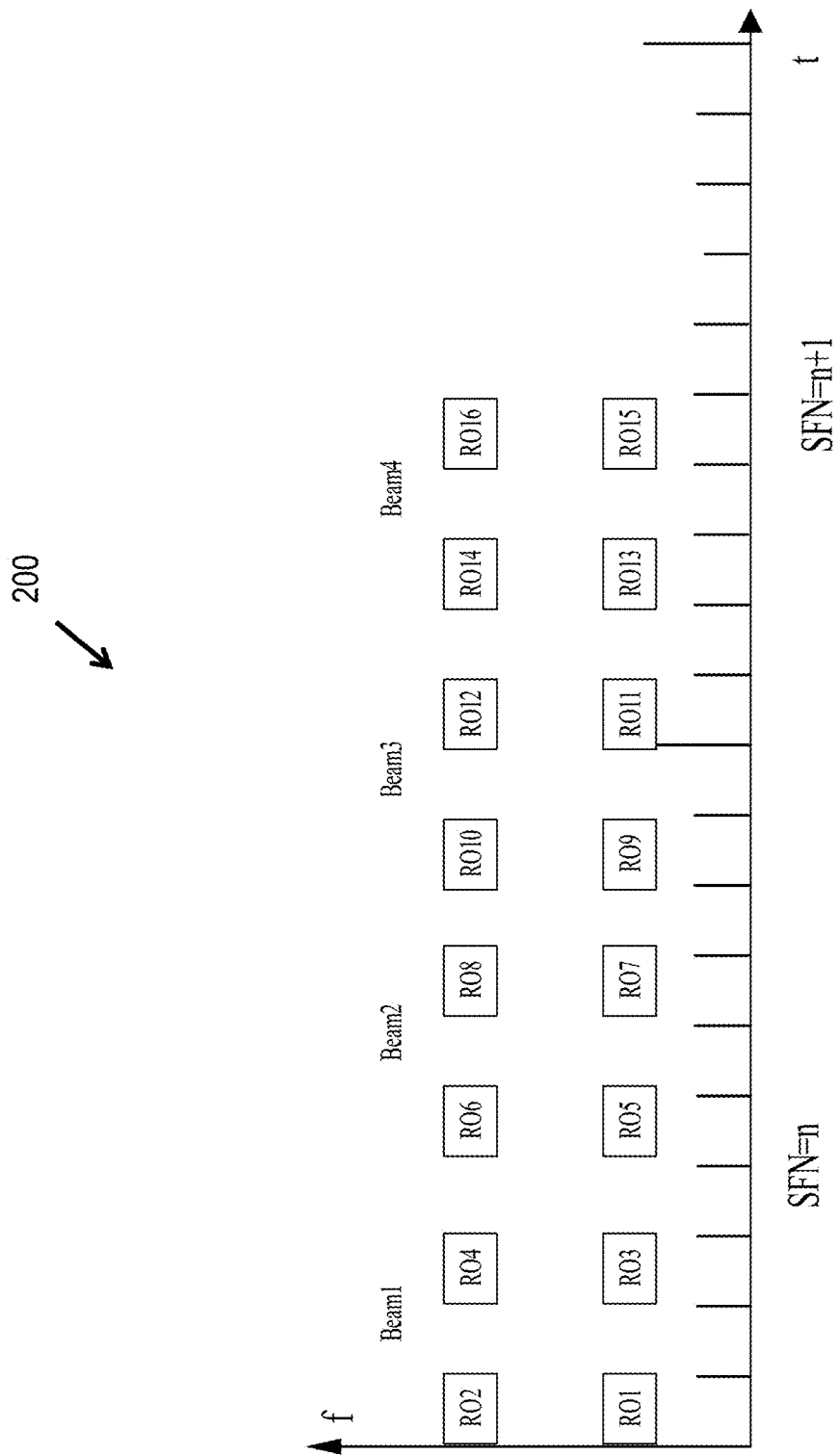
FIG. 3 shows an example mapping between RO and transmission beams.

RO is needed, the mapping from RO to each beam are shown in FIG. 3.

Step 3: The mapping from SI request to RO on each beam are shown as follow (Here take the preamble and SI combination mapping on Beam 1 as an example)

Figure 4:
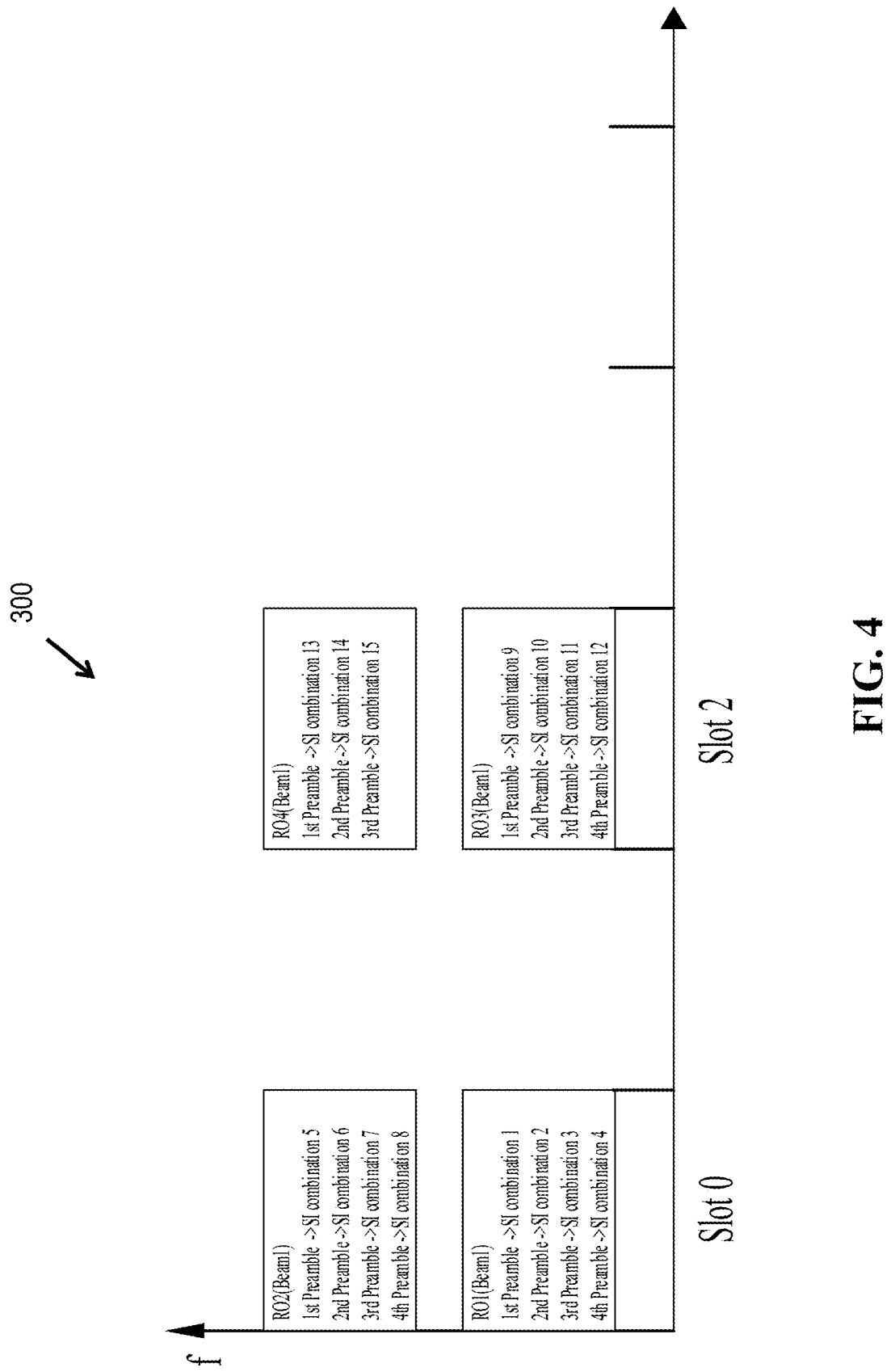
FIG. 4 shows an example mapping between SI requests and RO for each transmission beam.

In FIG. 4, the k th preamble is the kth preamble in the SI Preamble pool as explained in Example 2-3.

For RO5~RO8 on beam 2, RO9~RO12 on beam 3, RO13~RO816 on beam 4, the same mapping principle is used. Both the UE and NodeB uses the same mapping rule as above.

Example 3-3

The number of preambles that reserved for the SI request is larger than the number of the Msg1-based SIs Combinations: ($2^n-1$), where n is the number of the Msg1-Based SIs.

Assume the number of beams=4, and assume the RRC configure the following parameters for the Msg1-based SI request procedure:

The number of preambles that reserved for the SI request: 20

The Msg1-based SI Index list: SI1/SI2/SI3/SI4

The number of PRACH transmission occasions FDMed in one time slot: 2

Prach configuration Index 12 (the preamble was transmitted only at even SFN with subframe=0, 2, 4, 6, 8.

Step 1: Identify each SI combination based on the requested SI bitmap as in Table 1:

Step 2: Then for each beam, $$\left\lceil \frac{2^4 - 1}{20} \right\rceil = 1$$

RO is needed, the mapping from SI request to RO on each beam are shown as follow, It will be appreciated that, in one RO, the different beams are indicated.

Figure 5:
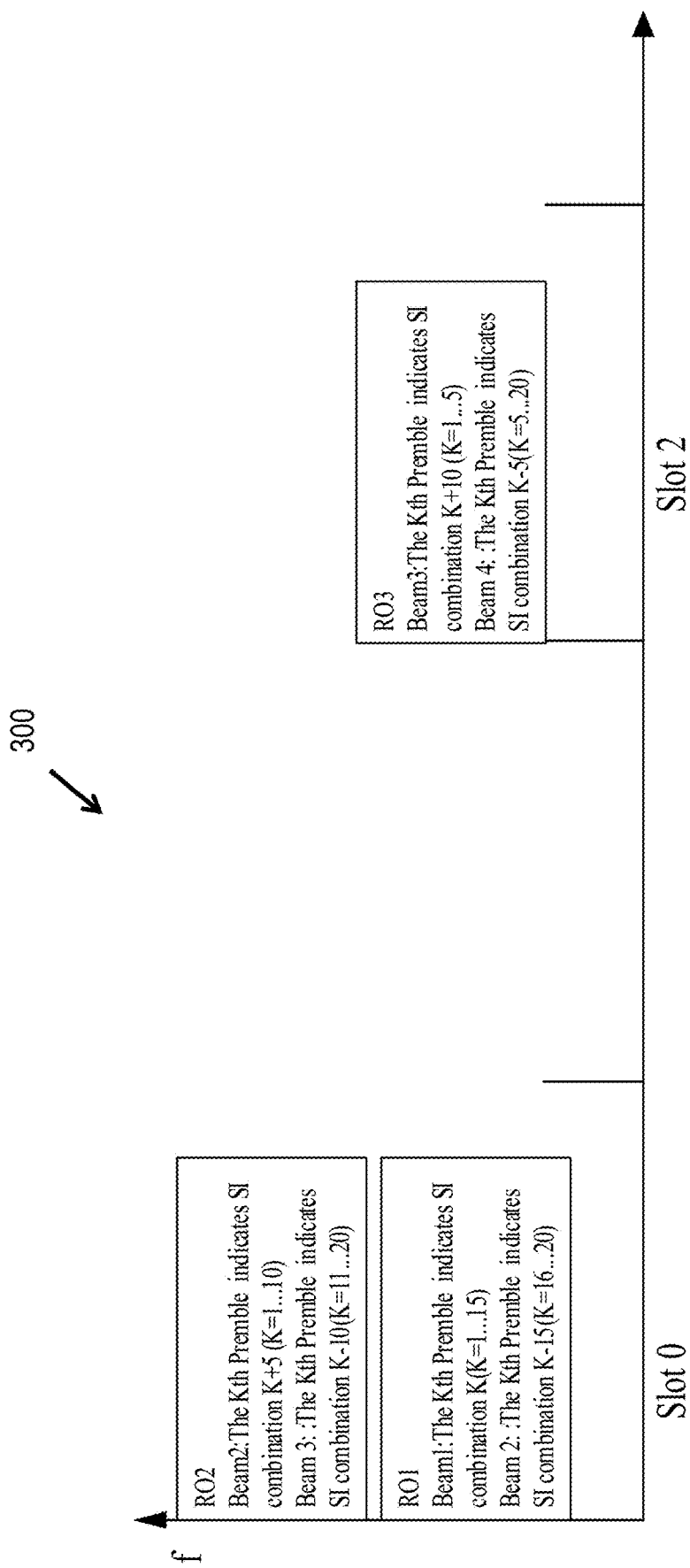
FIG. 5 shows an example in which different beams are indicated in one RO.

In FIG. 5, the k th preamble is the kth preamble in the SI Preamble pool as explained in Example 2-3.

Both the UE and NodeB use the same mapping rule as above.

Implementation Example 4

Then network doesn't indicate the NumberOfRA-PreamblesForSIReq. The MAC entity determines the corresponding preamble Index and RACH resource based on the Number of SSBs per RACH occasion.

Example 4-1

There are ½ SSB for each RO or for each SSB, there are 2 ROs and 36 preamble Indexes are reserved for normal RA as follows (Table 15):

TABLE 15 ssb-perRACH-OccasionAndCB-PreamblesPerSSB  CHOICE {
   oneHalf                      ENUMERATED
{n4,n8,n12,n16,n20,n24,n28,n32,n36,n40,n44,n48,n52,n56,n60,n64}, Assume the number of beams=4, and assume the RRC configure the following parameters for the Msg1-based SI request procedure:

The Msg1-based SI Index list: SI1/SI2/SI3/SI4 (refer to Example 2-1)

The number of PRACH transmission occasions FDMed in one time slot: 2

Prach configuration Index 12 (the preamble was transmitted only at even SFN with subframe=0, 2, 4, 6, 8. These values are shown in Table 16.

TABLE 16

| PRACH Configuration Index | Preamble format | $n_{SFN}$ mod x = y | | Subframe number | Starting symbol | Number of PRACH slots within a subframe | Number of PRACH occasions within a RACH slot |
|---|---|---|---|---|---|---|---|
| 12 | 0 | 1 | 0 | 0, 2, 4, 6, 8 | — | — | — |

Step 1: Identify each SI combination based on the requested SI bitmap as in Table 17:

TABLE 17

| Indexes for each SI combination ||
|---|---|
| SI combination Index | SI bitmap |
| Index 1 | SI4--0001 |
| Index 2 | SI3 --0010 |
| Index 3 | SI3/SI4--0011 |
| Index 4 | SI2-0100 |
| Index 5 | SI2/SI4--0101 |
| Index 6 | SI2/SI3--0110 |
| Index 7 | SI2/SI3/SI4--0111 |
| Index 8 | SI1--1000 |
| Index 9 | SI1/SI4--1001 |
| Index 10 | SI1/SI3--1010 |
| Index 11 | SI1/SI3/SI4--1011 |
| Index 12 | SI1/SI2--1100 |
| Index 13 | SI1/SI2/SI4--1101 |
| Index 14 | SI1/SI2/SI3--1110 |
| Index 15 | SI1/SI2/SI3/SI4--1111 |

Figure 6:
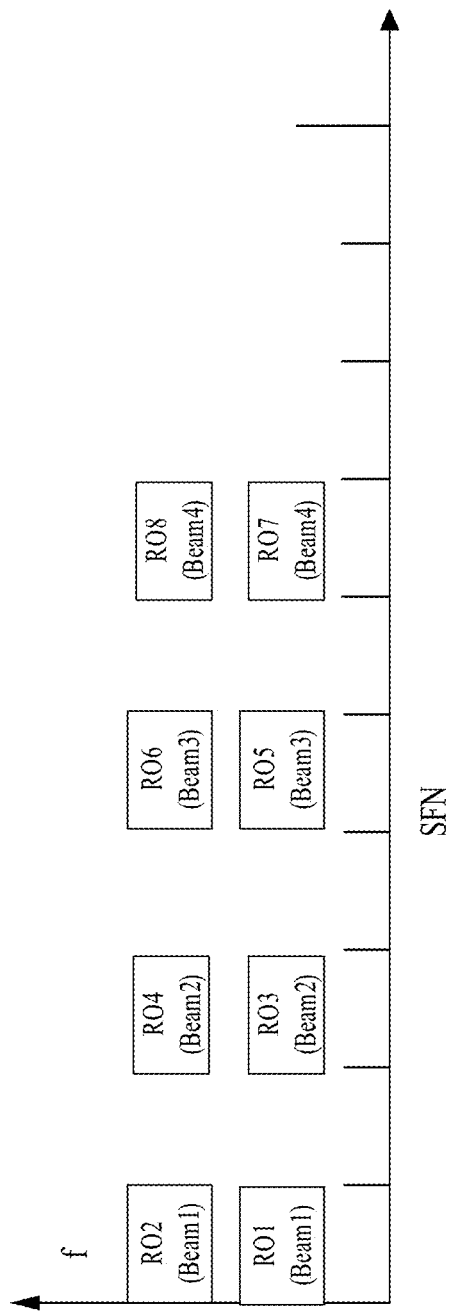
FIG. 6 shows an example of mapping between RO and transmission beams.

Step 2: Then for each beam, there are 2 ROs, the mapping from RO to each beam is shown in FIG. 6.

Step 3: For that there are 2 ROs for each beam, then $$\left\lceil \frac{2^4-1}{2} \right\rceil = 8$$

preambles will be reserved for the SI request. If the related parameters are configured as follows (Table 18):

TABLE 18 numberOfRA-PreamblesForSIReq    not present
    preambleForSIReqIndex- Start    40
    ssb-perRACH-OccasionAndCB-PreamblesPerSSB    CHOICE {
        oneHalf                         ENUMERATED
{n4,n8,n12,n16,n20,n24,n28,n32,n36,n40,n44,n48,n52,n56,n60,n64},
    }

Figure 7:
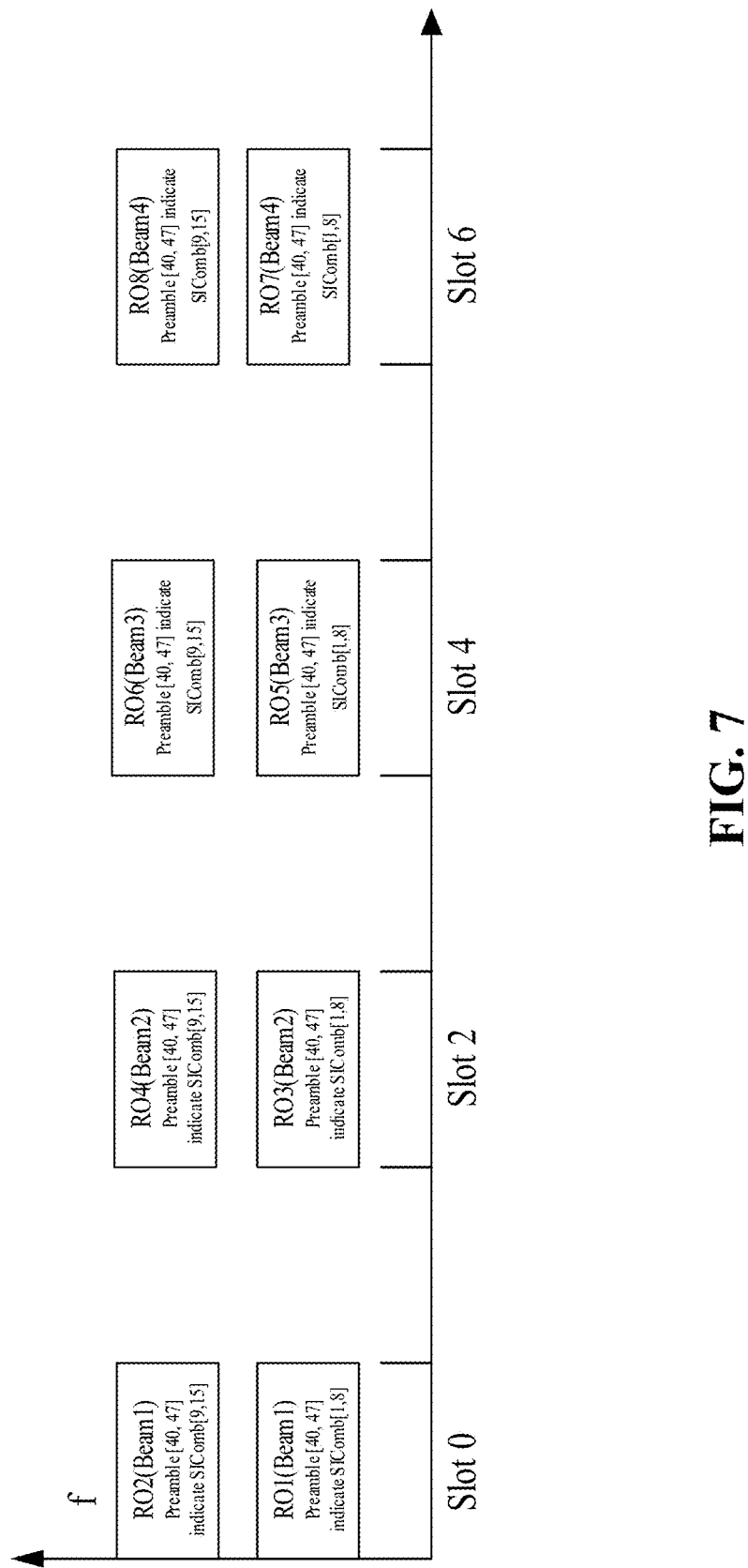
FIG. 7 shows an example of mapping between SI requests and RO on transmission beams.

Then the preamble Indexes that used for the SI request will be [40,47]. The mapping from SI request to RO on each beam are shown in FIG. 7.

If the related parameters are configured as follows (Table 19):

TABLE 19 numberOfRA-PreamblesForSIReq    not present
    preambleForSIReqIndex- Start    not present
    ssb-perRACH-OccasionAndCB-PreamblesPerSSB    CHOICE {
        oneEighth                        ENUMERATED
{n4,n8,n12,n16,n20,n24,n28,n32,n36,n40,n44,n48,n52,n56,n60,n64},
    }

Figure 8:
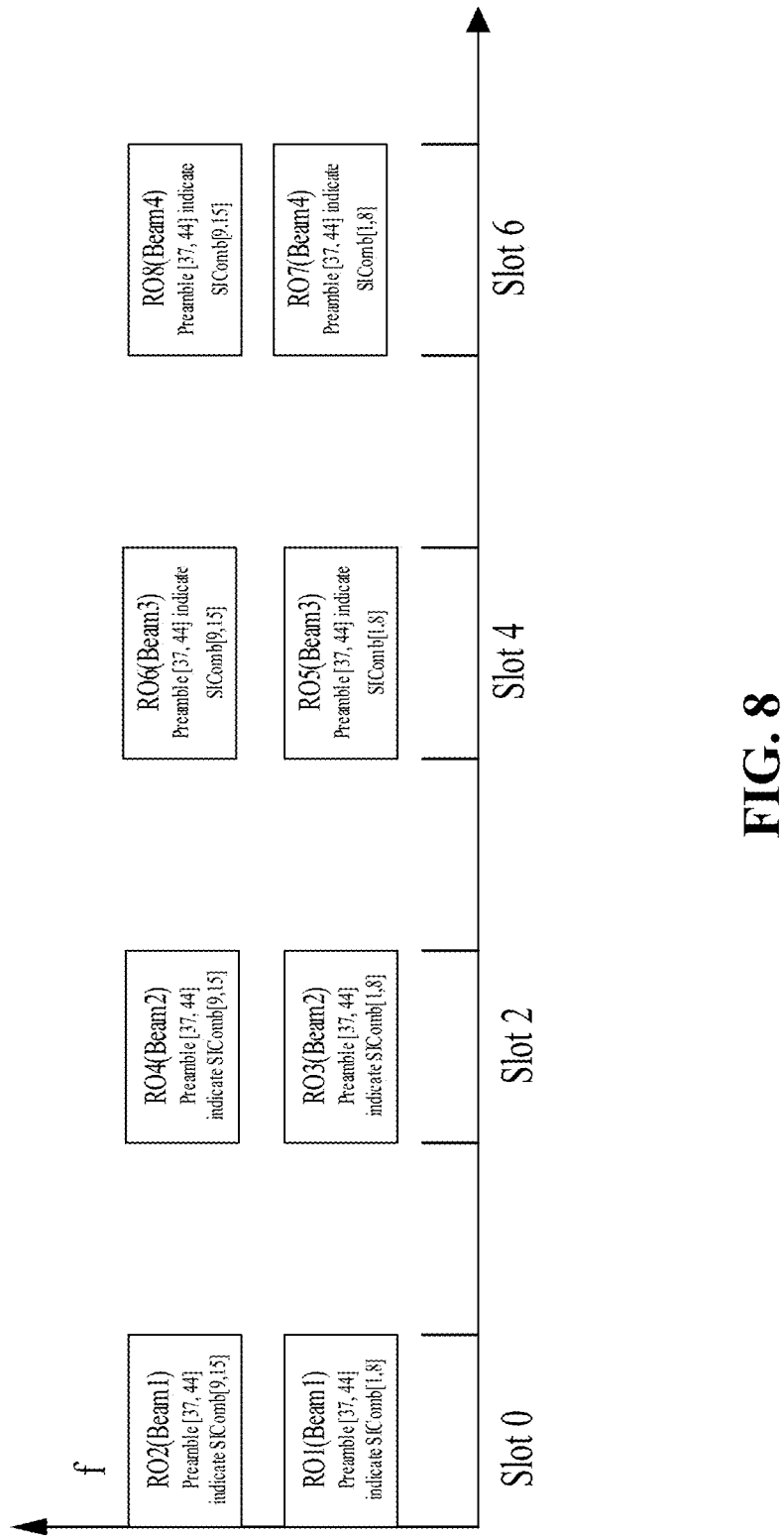
FIG. 8 shows an example of mapping between SI requests and RO.

Then the preamble Indexes that used for the SI request will be [37, 44]. Both the UE and NodeB will comply the same mapping rule as above. The mapping from SI request to RO on each beam are shown in FIG. 8.

Example 4-2

There are one SSB for each RO or for each SSB, there are 2 ROs and 36 preamble Indexes are reserved for normal RA as follows (Table 20):

TABLE 20 ssb-perRACH-OccasionAndCB-PreamblesPerSSB    CHOICE {
    one                             ENUMERATED
{n4,n8,n12,n16,n20,n24,n28,n32,n36,n40,n44,n48,n52,n56,n60,n64}, Assume the number of beams=4, and assume the RRC configure the following parameters for the Msg1-based SI request procedure:
  The Msg1-based SI Index list: SI1/SI2/SI3/SI4 (refer to Example 2-1)
  The number of PRACH transmission occasions FDMed in one time slot: 1
  Prach configuration Index 12 (the preamble was transmitted only at even SFN with subframe=0, 2, 4, 6, 8. These values are shown in Table 21.

Figure 9:
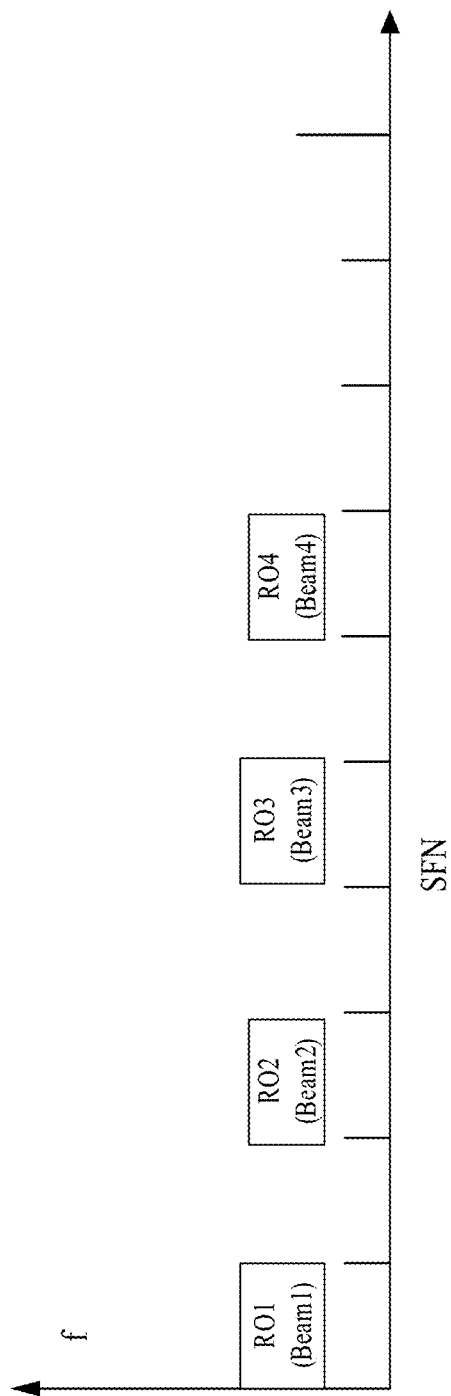
FIG. 9 shows an example of mapping for RO of each transmission beam.

Step 1: Identify each SI combination based on the requested SI bitmap as in Table 22:
Step 2: Then for each beam, there are 1 RO, the mapping from RO to each beam is shown in FIG. 9.
Step 3: For that there are 2 ROs for each beam, then $(2^4-1)*1=15$ preambles will be reserved for the SI request. If the related parameters are configured as follows (Table 22):

TABLE 22 numberOfRA-PreamblesForSIReq    not present
    preambleForSIReqIndex- Start    40
    ssb-perRACH-OccasionAndCB-PreamblesPerSSB    CHOICE {
        one                             ENUMERATED
{n4,n8,n12,n16,n20,n24,n28,n32,n36,n40,n44,n48,n52,n56,n60,n64},
    }

Figure 10:
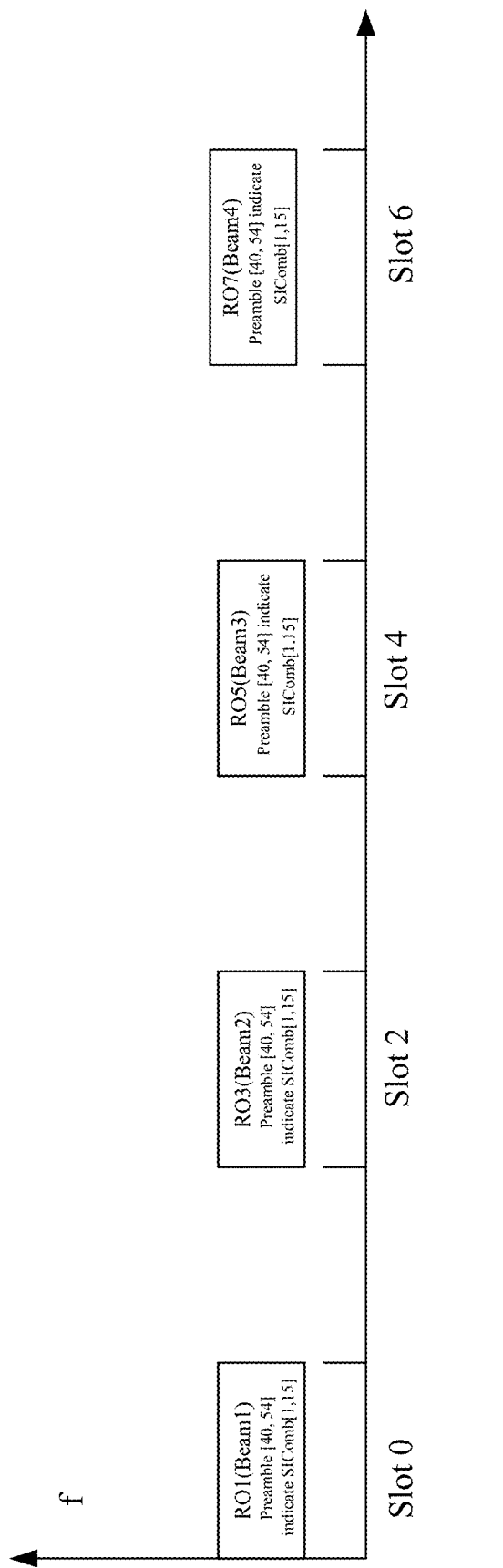
FIG. 10 shows an example of mapping between SI requests and RO.

Then the preamble Indexes that used for the SI request will be [40,54]. The mapping from SI request to RO on each beam are shown in FIG. 10.

If the related parameters are configured as follows (Table 23):

TABLE 23 numberOfRA-PreamblesForSIReq    not present
    preambleForSIReqIndex- Start    not present
    ssb-perRACH-OccasionAndCB-PreamblesPerSSB    CHOICE {
        one                             ENUMERATED
{n4,n8,n12,n16,n20,n24,n28,n32,n36,n40,n44,n48,n52,n56,n60,n64},
    }

Figure 11:
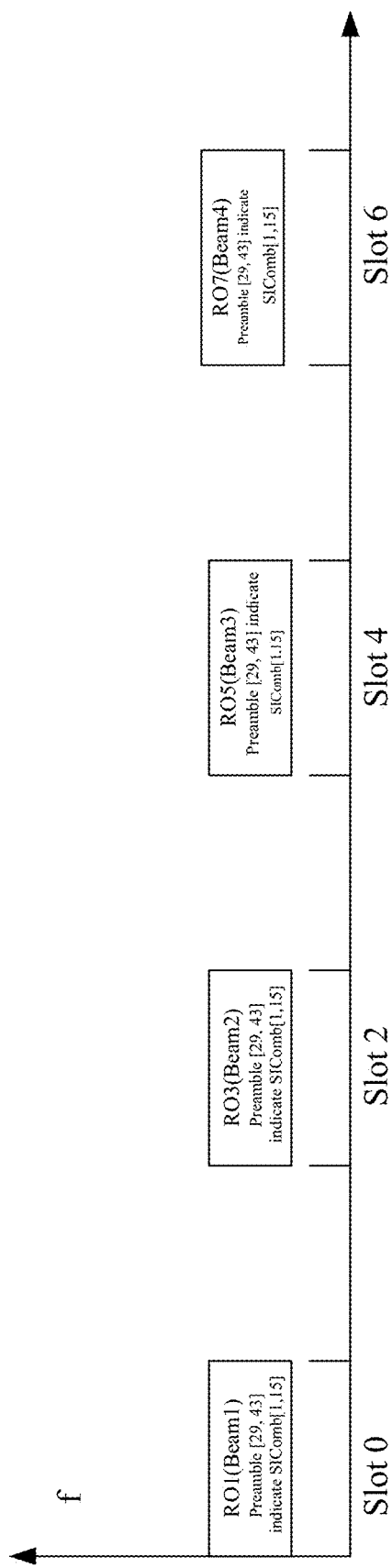
FIG. 11 shows an example of mapping between SI requests and RO.

Then the preamble Indexes that used for the SI request will be [29, 43], and the mapping from SI request to RO on each beam are shown in FIG. 11.

Both the UE and NodeB will comply the same mapping rule as above.

Example 4-3

There are 2 SSB for each RO or for each SSB, there are 2 ROs and 36 preamble Indexes are reserved for normal RA as follows (Table 24).

TABLE 24 ssb-perRACH-OccasionAndCB-PreamblesPerSSB    CHOICE {
    two                             ENUMERATED
{n4,n8,n12,n16,n20,n24,n28,n32},
}

Assume the number of beams=4, and assume the RRC configure the following parameters for the Msg1-based SI request procedure:
  The Msg1-based SI Index list: SI1/SI2/SI3/SI4 (refer to Example 2-1)
  The number of PRACH transmission occasions FDMed in one time slot: 1
  Prach configuration Index 12 (the preamble was transmitted only at even SFN with subframe=0, 2, 4, 6, 8. These values are shown in Table 25.

TABLE 21

| PRACH Configuration Index | Preamble format | $n_{SFN}$ mod x = y | | Subframe number | Starting symbol | Number of PRACH slots within a subframe | Number of PRACH occasions within a RACH slot |
|---|---|---|---|---|---|---|---|
| 12 | 0 | 1 | 0 | 0, 2, 4, 6, 8 | — | — | — |

TABLE 25

| PRACH Configuration Index | Preamble format | $n_{SFN}$ mod x = y | | Subframe number | Starting symbol | Number of PRACH slots within a subframe | Number of PRACH occasions within a RACH slot |
|---|---|---|---|---|---|---|---|
| 12 | 0 | 1 | 0 | 0, 2, 4, 6, 8 | — | — | — |

Figure 12:
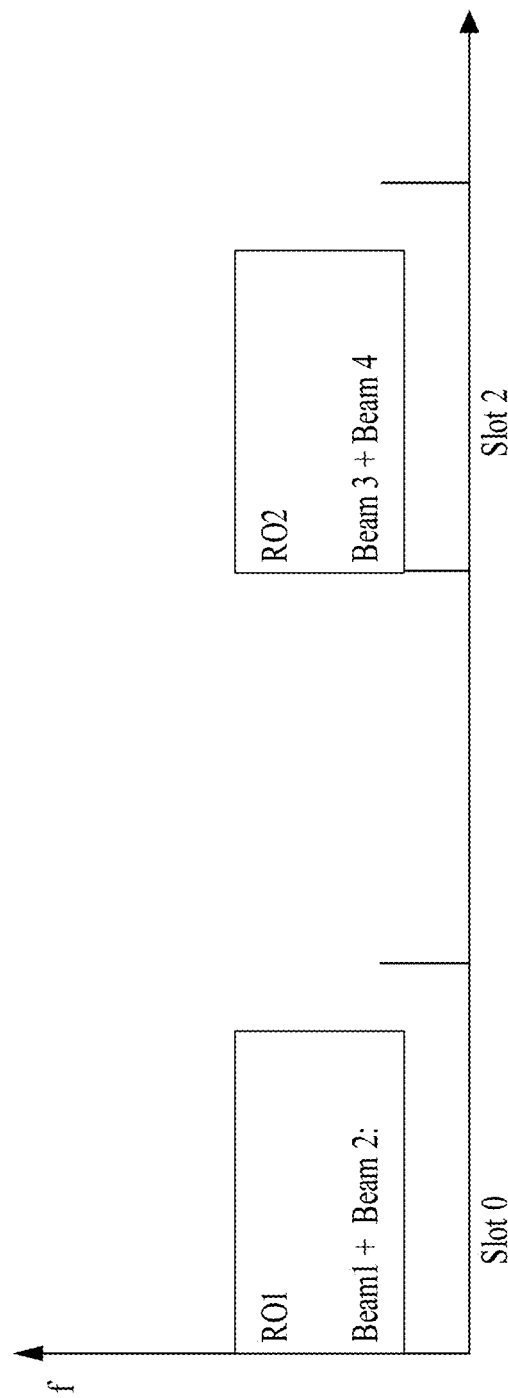
FIG. 12 shows an example of a mapping for RO of each transmission beam.

Step 1: Identify each SI combination based on the requested SI bitmap as in Table 26:

Step 2: Then for each RO, there are 2 beams, the mapping from RO to each beam is shown in FIG. 12.

Step 3: For that there are 2 beams for each RO, then $(2^4-1)*2=30$ preambles will be reserved for the SI request. If the related parameters are configured as follows (Table 26):

TABLE 26 numberOfRA-PreamblesForSIReq    not present
    preambleForSIReqIndex- Start    not present
ssb-perRACH-OccasionAndCB-PreamblesPerSSB    CHOICE {
    two                                         ENUMERATED
{n4,n8,n12,n16,n20,n24,n28,n32},
    }

Then the distribution of preambles will be as follows (Table 27A and Table 27B):

TABLE 27A

|  | Beam 1 | Beam 2 | Beam 3 | Beam 4 |
|---|---|---|---|---|
| Normal RA | 1~16 | 17~32 | 1~16 | 17~32 |
| SI request | 33~47 | 48~62 | 33~47 | 48~62 |

TABLE 27B

|  | Beam 1 | Beam 2 | Beam 3 | Beam 4 |
|---|---|---|---|---|
| Normal RA | 1~16 | 32~47 | 1~16 | 32~47 |
| SI request | 17~31 | 48~62 | 17~31 | 48~62 |

Figure 13:
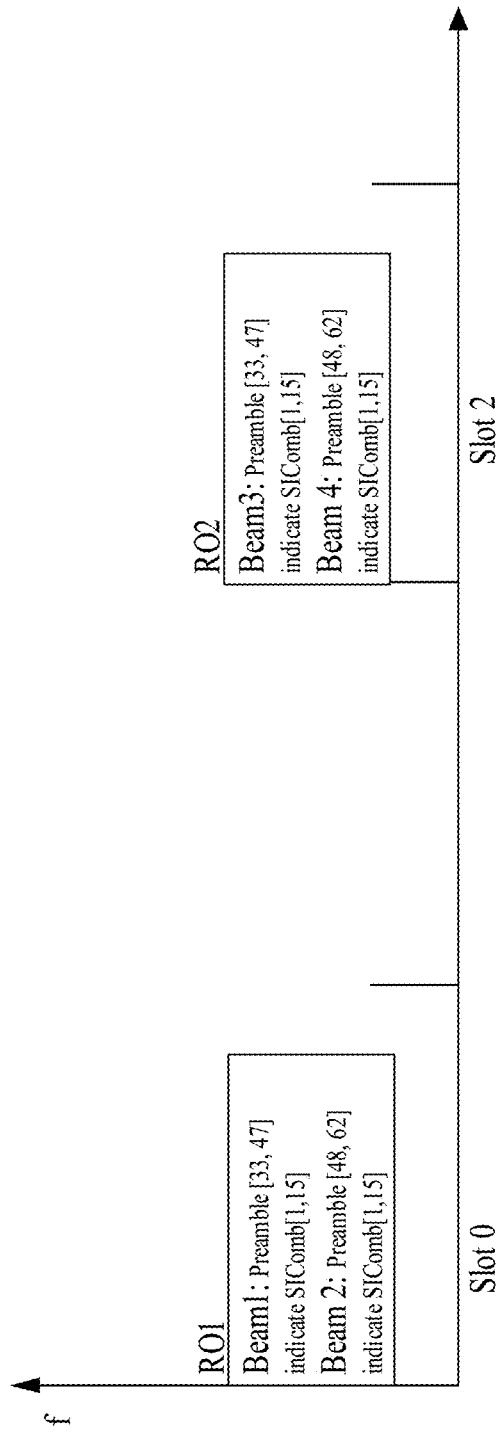
FIG. 13 shows an example of mapping from SI request to RO.

Here Table 27A is shown as an example, then the mapping from SI request to RO on each beam are shown in FIG. 13.

Both the UE and the base station (e.g., NodeB) will use the same mapping rule as above. Accordingly, in various embodiments, the following techniques may be implemented in a combination of one or more of the techniques by a base station or a user device.

Technique 1: NodeB indicates the number of preambles that are reserved for the SI request.

Technique 1.1: If an explicit indication of the number of preambles is absent, then the number of preambles=$(2^n-1)$*ssbperRACHOccasion in which ssbperRACHOccasion is the number of the actual used preambles for the SI request, n is the number of Msg1-based SIs. The ssbperRACHOccassion parameter may be known a priori to both the UE and eNodeB.

Technique 2: NodeB indicates the Start preamble Index used for SI request.

Technique 2.1: If absent, the start preamble Index depends on a parameter CB-preambles-per-SSB, where the CB-preambles-per-SSB is the number of normal RA per synchronization signal block SSB.

Technique 3: NodeB indicates the Msg1 based SI request Bitmap.

Technique 3.1: At UE side, UE determine the Msg1-based SI Index list based on the Msg1 based SI request Bitmap.

Technique 4: RRC configure the following SI request related parameters for the Msg1-based SI request procedure:

The number of preambles that reserved for the SI request if it is present (this parameter is optional)

The start preamble Index if it is present (this parameter is optional)

The Msg1-based SI Index list or Msg1-basedSIReqBitmap

The number of PRACH transmission occasions frequency division multiplexed (FDMed) in one time slot (this parameter is optional)

Prach configuration Index.

Technique 5: MAC Entity sort the Msg1 based SI Combination.

Technique 5.1 Use a bitmap to indicate SI request, 1 means this SI is requested, 0 means this SI is not needed.

Technique 5.2 The index for each SI combination could be $x=\Sigma_{i=1}^{n}i*2^{i-1}$, where i is the ith bit in the Request SI bitmap, n is the number of the Msg1 based SI.

Technique 6: MAC entity map the SI request to each RO and each beam.

Technique 6.1: if the number of preambles that reserved for the SI request is not indicated, MAC Entity determine the number of RO for each beam based on the ssb-perRACH-OccasionA.

Technique 6.1.1: MAC Entity determine the number of SI request Preambles based on the number of Msg1 based SI and ssb-perRACH-OccasionA.

In this case, the number of preambles M=$\lceil(2^n-1)*$ssbperRACHOccasion$\rceil$ Technique 6.1.2: MAC Entity further determine the preamble Indexes that used for the SI request based on start preamble Index.

Technique 6.1.2.1: if preambleForS/ReqIndex−Start present, the preamble Indexes that used for the SI Request is:
[preambleForSIReqIndex−Start, preambleForSIReqIndex−Start+M−1]

Technique 6.1.2.2: else, the preamble Indexes that used for the SI Request will be
[CB-PreamblesPerSSB+1, CB-PreamblesPerSSB+M]

Technique 6.1.3: The MAC entity determines the mapping from preamble Index and/or RO to each SI combination.

Technique 6.1.3.1: For each RO, there would be $\lceil(2^n-1)*$ssbperRACHOccasion$\rceil$ SI combinations with number of preambles=$\lceil(2^n-1)*$ssbperRACHOccasion$\rceil$ Technique 6.1.3.2: If ssbperRACHOccasion<=1, then for this beam, the relationship between SI Combination Index and selected m will satisfy the following equation:

SI Combination Index $x=(k-1)*\lceil(2^n-1)*$ssbperRACHOccasion$\rceil+m$, in which m is the m th preamble in the number of $\lceil(2^n-1)*$ssbperRACHOccasionl$\rceil$ preambles k is the kth RO for each beam k=[1, 1/ssbperRACHOccasion].

Technique 6.1.3.3: If ssbperRACHOccasion>1, the relationship between SI Combination Index and selected m will satisfy the following equation, in which m is the m th preamble in $\lceil(2^n-1)*\text{ssbperRACHOccasion}\rceil$ preambles, k is the kth beam in the RO k=[1, ssbperRACHOccasion].

Technique 6.4: If the number of preambles M that reserved for the SI request is indicated, MAC Entity determine the number of RO for each beam based on the number of preambles that reserved for the SI request.

Technique 6.4.2: MAC Entity further determine the preamble Indexes that used for the SI request based on start preamble Index.

Technique 6.4.2.1: if preambleForSIReqIndex-Start present, the preamble Indexes that used for the SI Request will be:

[preambleForSIReqIndex-Start, preambleForSIReqIndex-Start+M−1]

Technique 6.4.2.2: else, the preamble Indexes that used for the SI Request will be

[CB-PreamblesPerSSB+1, CB-PreamblesPerSSB+M]

Technique 6.5.2: If there are M preamble Indexes reserved for SI request $M<=2^n-1$, then for this beam, there would be $$\left\lceil \frac{2^n-1}{m} \right\rceil$$

ROs, the relationship between SI Combination Index and selected m will satisfy the following equation:

SI Combination Index x=(k−1)*M+m, in which m is them th preamble M preambles, k is the kth RO for each beam k=[1, $$\left\lceil \left\lceil \frac{2^n-1}{m} \right\rceil \right\rceil$$

Technique 6.5.3: If there are M preamble Indexes reserved for SI request $M>2^n-1$, then for B beams, there should be $B*(2^n-1)$ different Preamble/RO combinations, then we assign these $B*(2^n-1)$ different Preamble/RO combinations to the different SI combinations on different beams according to the following window:

Technique 6.5.3.1: In the order of increasing preamble indices in single RACH occasion and then.

Technique 6.5.3.2: In the order of increasing the number of frequency multiplexed RACH occasions and then.

Technique 6.5.3.3: In the order of increasing the number of time multiplexed RACH occasions within a RACH slot.

Technique 6.5.3.4: In the order of increasing the number of RACH slots.

Figure 17:
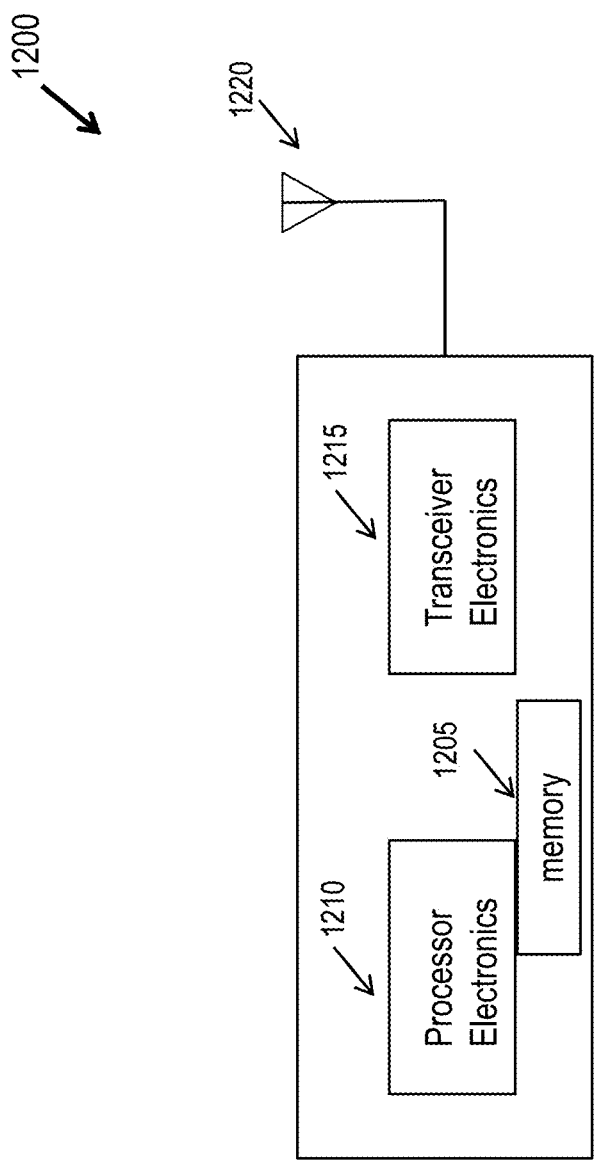
FIG. 17 is a block diagram of an example of a wireless communication apparatus.

FIG. 17 is a block diagram of an example implementation of a wireless communication apparatus 1200. The methods 1500, 1550, 1600, 1650 may be implemented by the apparatus 1200. In some embodiments, e.g., when implementing method 1500 and 1550, the apparatus 1200 may be a base station of a wireless network. In some embodiments, e.g., when implementing method 1600 or 1650, the apparatus 1200 may be a user device. The apparatus 1200 includes one or more processors, e.g., processor electronics 1210, transceiver circuitry 1215 and one or more antenna 1220 for transmission and reception of wireless signals. The apparatus 1200 may include memory 1205 that may be used to store data and instructions used by the processor electronics 1210. The apparatus 1200 may also include an additional network interface to one or more core networks or a network operator's additional equipment. This additional network interface, not explicitly shown in FIG. 17, may be wired (e.g., fiber or Ethernet) or wireless.

Figure 18:
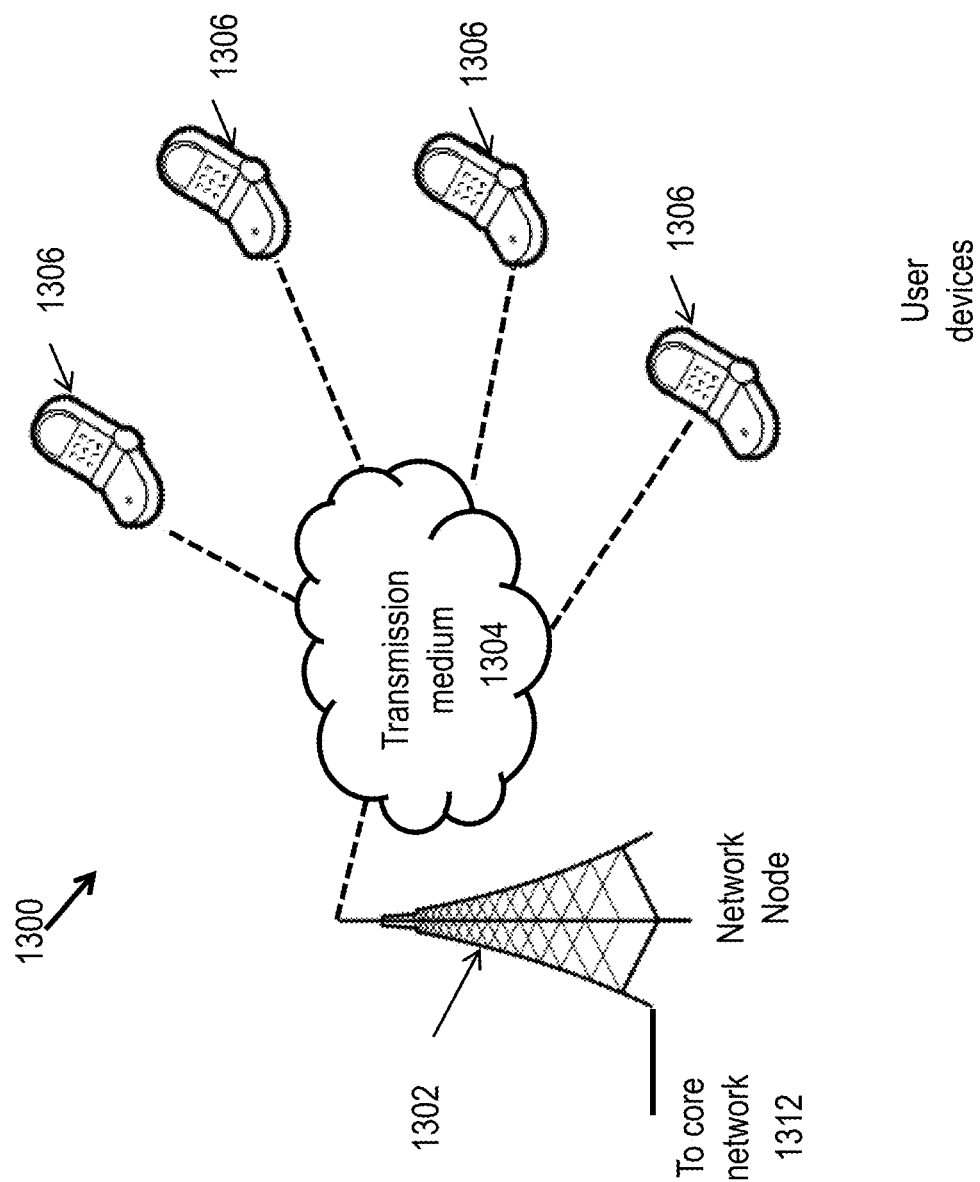
FIG. 18 shows an example wireless communications network.

FIG. 18 depicts an example of a wireless communication system 1300 in which the various methods described herein can be implemented. The system 1300 includes a base station 1302 that may have a communication connection with core network (1312) and to a wireless communication medium 1304 to communicate with one or more user devices 1306. He user devices 1306 could be smartphones, tablets, machine to machine communication devices, Internet of Things (IoT) devices, and so on.

It will be appreciated that several techniques for mapping (and correspondingly un-mapping) relationship between preambles used for requesting system information are disclosed. In some embodiments, a number of preambles may be reserved for system information requests. Several additional techniques and examples have been described by which both a network node and a UE can determine preambles to use for system information requests.

The disclosed and other embodiments, modules and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few examples and implementations are disclosed. Variations, modifications, and enhancements to the described examples and implementations and other implementations can be made based on what is disclosed.

The invention claimed is:

1. A method for wireless communication, comprising:
receiving, by a mobile device, configuration information from a base station for configuring a random-access transmission to request system information, wherein the configuration information indicates a number of Synchronization Signal (SS) and Physical Broadcast Channel (PBCH) blocks per random-access transmission occasion, wherein the configuration information includes a start preamble index indicating a preamble index for requesting system information, and wherein the configuration information further indicates a number of random access channel transmission occasions reserved for requesting system information, the random access channel transmission occasions being frequency division multiplexed in one time slot;

mapping, by the mobile device, one or more consecutive random-access transmission occasions to an SS and PBCH block based on the configuration information, wherein a preamble to be used to request the system information is determined based on the start preamble index and the mapped SS and PBCH block; and performing, by the mobile device, the random-access transmission based on the mapping.

2. The method of claim 1, wherein the configuration information is carried in a radio resource control (RRC) message.

3. The method of claim 1, wherein, for the determined preamble, the one or more consecutive random-access transmission occasions are ordered (1) in an increasing order of frequency multiplexed transmission occasions, (2) in an increasing order of time multiplexed occasions within a slot, and (3) in an increasing order of random-access channel slots.

4. The method of claim 1, wherein the system information is requested based on a Msg1.

5. A method for wireless communication, comprising:
transmitting, by a base station, configuration information to a mobile device for configuring a random-access transmission to request system information, wherein the configuration information indicates a number of Synchronization Signal (SS) and Physical Broadcast Channel (PBCH) blocks per random-access transmission occasion, wherein the configuration information includes a start preamble index indicating a preamble index for requesting system information, and wherein the configuration information further indicates a number of random access channel transmission occasions reserved for requesting system information, the random access channel transmission occasions being frequency division multiplexed in one time slot; and receiving, by the base station, the random-access transmission from the mobile device, wherein, for the random-access transmission, one or more consecutive random-access transmission occasions are mapped to an SS and PBCH block based on the configuration information, and wherein a preamble that is used to request the system information is determined based on the start preamble index and the mapped SS and PBCH block.

6. The method of claim 5, wherein the configuration information is carried in a radio resource control (RRC) message.

7. The method of claim 5, wherein, for the determined preamble, the one or more consecutive random-access transmission occasions are ordered (1) in an increasing order of frequency multiplexed transmission occasions, (2) in an increasing order of time multiplexed occasions within a slot, and (3) in an increasing order of random-access channel slots.

8. The method of claim 5, wherein the system information is requested based on a Msg1.

9. A wireless communications apparatus comprising a processor, wherein the processor is configured to:
receive configuration information from a base station for configuring a random-access transmission to request system information, wherein the configuration information indicates a number of Synchronization Signal (SS) and Physical Broadcast Channel (PBCH) blocks per random-access transmission occasion, wherein the configuration information includes a start preamble index indicating a preamble index for requesting system information, and wherein the configuration information further indicates a number of random access channel transmission occasions reserved for requesting system information, the random access channel transmission occasions being frequency division multiplexed in one time slot;

map one or more consecutive random-access transmission occasions to an SS and PBCH block based on the configuration information, wherein a preamble to be used to request the system information is determined based on the start preamble index and the mapped SS and PBCH block; and perform the random-access transmission using the preamble.

10. The apparatus of claim 9, wherein the configuration information is carried in a radio resource control (RRC) message.

11. The apparatus of claim 9, wherein, for the determined preamble, the one or more consecutive random-access transmission occasions are ordered (1) in an increasing order of frequency multiplexed transmission occasions, (2) in an increasing order of time multiplexed occasions within a slot, and (3) in an increasing order of random-access channel slots.

12. The apparatus of claim 9, wherein the system information is requested based on a Msg1.

13. A wireless communications apparatus comprising a processor, wherein the processor is configured to:

transmit configuration information to a mobile device for configuring a random-access transmission to request system information, wherein the configuration information indicates a number of Synchronization Signal (SS) and Physical Broadcast Channel (PBCH) blocks per random-access transmission occasion, wherein the configuration information includes a start preamble index indicating a preamble index for requesting system information, and wherein the configuration information further indicates a number of random access channel transmission occasions reserved for requesting system information, the random access channel transmission occasions being frequency division multiplexed in one time slot; and receive the random-access transmission from the mobile device, wherein, for the random-access transmission, one or more consecutive random-access transmission occasions are mapped to an SS and PBCH block based on the configuration information, and wherein a preamble that is used to request the system information is determined based on the start preamble index and the mapped SS and PBCH block.

14. The apparatus of claim 13, wherein the configuration information is carried in a radio resource control (RRC) message.

15. The apparatus of claim 13, wherein, for the determined preamble, the one or more consecutive random-access transmission occasions are ordered (1) in an increasing order of frequency multiplexed transmission occasions, (2) in an increasing order of time multiplexed occasions within a slot, and (3) in an increasing order of random-access channel slots.

16. The apparatus of claim 13, wherein the system information is requested based on a Msg1.

* * * * *